(12) United States Patent
Meyer et al.

(10) Patent No.: US 6,203,840 B1
(45) Date of Patent: *Mar. 20, 2001

(54) PROCESS FOR MANUFACTURING A PASTA PRODUCT

(75) Inventors: Philipp Paul Meyer, Benglen (CH); Eugene Scoville, New Milford, CT (US); Göran Jaelminger, Helsingborg (SE)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,682

(22) Filed: Mar. 26, 1999

(30) Foreign Application Priority Data

Mar. 29, 1998 (EP) .................................. 98200986

(51) Int. Cl.$^7$ ........................................ A23L 1/162
(52) U.S. Cl. .................. 426/557; 426/324; 426/451; 426/506
(58) Field of Search ..................... 426/451, 557, 426/506, 508, 509, 321, 324, 325, 326

(56) References Cited

U.S. PATENT DOCUMENTS

| 4,552,772 | 11/1985 | Saitoh et al. | 426/557 |
|---|---|---|---|
| 4,828,852 | 5/1989 | Hsu et al. | 426/94 |

FOREIGN PATENT DOCUMENTS

| 0 275 717 | 12/1986 | (EP) . |
|---|---|---|
| 0 489 811 B1 | 8/1990 | (EP) . |
| 0 484 669 A1 | 9/1991 | (EP) . |
| 0 602 953 A2 | 12/1993 | (EP) . |
| 0 626 137 A1 | 5/1994 | (EP) . |
| 0 807 386 A2 | 1/1997 | (EP) . |
| 2 502 907 | 3/1982 | (FR) . |
| 57-209275 | 1/1982 | (JP) . |
| 1074958 | 3/1989 | (JP) . |

*Primary Examiner*—Lien Tran
(74) *Attorney, Agent, or Firm*—Pennie & Edmonds LLP

(57) ABSTRACT

Full-moisture, shelf-stable pasta product having a pH of about 3.7 to 4.5, and comprising a cooked or pre-cooked pasta having a dry-matter content of from about 30 to 45 percent by weight, an acid, and an oil. A process for manufacturing a full-moisture, shelf-stable pasta product, which comprises preparing a mixture having a dry-matter content of 60 to 75 weight percent and comprising a cereal flour or semolina and added water, forming a portioned pasta product, blanching the pasta product, dipping the blanched pasta product into acidified water at ambient temperature, and packaging the pasta product.

14 Claims, No Drawings

PROCESS FOR MANUFACTURING A PASTA PRODUCT

FIELD OF THE INVENTION

The present invention relates to a pasta product consisting of cooked or pre-cooked pasta having a long shelf life.

BACKGROUND OF THE INVENTION

U.S. Pat. No. 4,552,772 discloses a method for preparing a pre-cooked pasta product suitable for rapid cooking without using artificial preservatives. This process comprises boiling the pastas and washing said pasta with water, the improvement comprising immersing the boiled pastas in an aqueous solution containing at least one of citric acid and lactic acid, and table salt, then packaging and heat sterilizing the pastas which have been immersed, said aqueous solution having a pH such that the pH of the boiled pastas, after immersion, is about 3.9 to 4.3. However, the pasta pieces tend to stick together after heat processing and are difficult to separate, which is not convenient for consumption.

French Patent No. FR2502907 discloses the a process for the production of pre-cooked pasta product that comprises treating raw pasta product in the following stages: pre-cooking, preferably in acidified water, to give the product a moisture content sufficient for subsequent sterilization; cooling, preferably in a current of cold, acidified water; draining off excess water; oiling with a vegetable oil e.g., by vaporization; introducing into a flexible container; reduction and uniformization of thickness; sealing the containers in vacuum; heat sterilization of scaled containers. The use of vegetable oil prevents the pasta pieces from sticking together but, as a result, the pastas have an oily appearance and, because of the sterilization treatment, they have a less than desirable texture.

European Patent No. EP0489811 discloses a process for preparing an acid-stabilized pasta that comprises cooking the pasta in an aqueous acid solution or suspension having a pH of less than 6, and containing a polymeric food-acceptable acid in which the monomer unit has a molecular weight of about 190 g/mol.

European Patent No. EP0626137 discloses a pasteurized, shelf-stable, uncooked or partially cooked, moist pasta product packaged in a sealed container. The pasta product, which is partially dried after the acid treatment, is not treated with oil, has a moisture content from 15 percent to 38 percent, and a pH below 4.6.

SUMMARY OF THE INVENTION

The present invention discloses a full-moisture, shelf-stable pasta product, having a pH of about 3.5 to 4.5, that comprises a cooked or pre-cooked pasta having a dry-matter content from about 30 to 45 percent by weight, an acid, and an oil. In a preferred embodiment, the pH is from about 3.8 to 4.3.

In one embodiment, the acid comprises a food grade acid. Preferably, the acid comprises lactic acid, phosphoric acid, citric acid, and Glucono-delta-lactone, or a mixture thereof. In another embodiment, the oil is present in an amount of about 0.5 to 5 percent by weight. In still another embodiment, the oil is a vegetable oil. In a preferred embodiment, the vegetable oil is peanut oil, rapeseed oil, sunflower oil, palm oil, corn oil, palm olein, or a mixture thereof.

The present invention also discloses a process for manufacturing a full-moisture, shelf-stable pasta product which comprises preparing a mixture having a dry-matter content of 60 to 75 weight percent and comprising a cereal flour or semolina and added water; forming a portioned pasta product; blanching the pasta product; dipping the blanched pasta product into acidified water at ambient temperature; and packaging the pasta product.

In one embodiment, the pasta product is cooled with water having a temperature of about 60 to 70° C. subsequent to blanching. In another embodiment, the pasta product is oiled subsequent to the dipping. The oil is preferably present in an amount of about 0.5 to 5 percent by weight. In still another embodiment, the oil is a vegetable oil. In a preferred embodiment, the vegetable oil is peanut oil, rapeseed oil, sunflower oil, palm oil, corn oil, palm olein, or a mixture thereof.

In one embodiment, the blanching is carried out at a temperature of about 95 to 100° C. for a duration of about 1 to 10 min, while steaming with steam having a temperature of about 98 to 100° C., and spraying water having a temperature of about 95 to 98° C. In another embodiment, the dipping has a duration of about 50 to 250 s and the acidified water comprises about 0.5 to 2 percent acid, at ambient temperature. In still another embodiment, the acidified water comprises lactic acid, phosphoric acid, citric acid, and Glucono-delta-lactone, or a mixture thereof.

DESCRIPTION OF THE PREFERRED EMBODIMENTS

The full-moisture, shelf-stable pasta product, according to the present invention, has a pH of about 3.5 to 4.5, preferably about 3.8 to 4.3, and comprises a cooked or pre-cooked pasta having a dry-matter content of from about 30 to 45 percent by weight, an acid, and an oil.

The process for manufacturing a full-moisture, shelf-stable pasta product, according to the present invention, consists of preparing a mixture having a dry-matter content of about 60 to 75 percent and comprising a cereal flour or semolina and added water, extruding the mixture, cutting the extruded pasta, portioning, blanching, water cooling, dipping into an acidified water, oiling, packaging and in-pack pasteurizing it. As used herein, the expression "preparing a mixture" is defined as "preparing a mixture and/or kneading the mixture".

In the present pasta product, the cooked or pre-cooked pasta may have been made of a starting raw material mixture comprising a cereal flour or semolina, especially Durum or hard-wheat semolina, and possible additives such as wheat protein, especially gliadin-enriched wheat protein, soft wheat flour, egg material, bakery powder, sodium chloride, and/or spices.

The acid may be any food-grade acid. Preferably, the acid comprises lactic acid, phosphoric acid, citric acid, Glucono-delta-lactone, or a mixture thereof The oil may be a vegetable oil. The oil is preferably present in an amount of from about 0.5 to 5 percent by weight of the cooked or pre-cooked pasta. Preferably, the oil comprises peanut oil, rapeseed oil, sunflower oil, palm oil, corn oil, palm olein, or mixtures thereof. About 0.5 to 2 percent of emulsifiers, in percent by weight of the oil, may advantageously be added to the oil. Preferably, the emulsifier is comprised of a monoglyceride or a mixture of monoglyceride compounds.

To implement the present process, a mixture may be prepared having a dry-matter content of about 60 to 75 percent and comprising water, a cereal flour or semolina, and possible additives such as wheat protein, soft wheat flour, egg material, bakery powder, sodium chloride and/or spices. Preferably, the semolina comprises Durum or hard wheat semolina.

Wheat protein, especially gliadin-enriched wheat protein, such as "LAVOR PRO" from Midwest Grain Products, Inc. of Atchison, Kans., USA, may be used in an amount of from about 1 to 3 percent by weight of the mixture in order to reduce stickiness and starch losses during cooking and acidification. Soft wheat flour may be added to the mixture in order to increase the elasticity of the pasta product. Egg material in the form of whole egg powder, egg white powder, or liquid whole egg may be added to the mixture in order to increase the firmness of the pasta product. Bakery powder may be added to the mixture in order to create a porous pasta product. Preferably, the bakery powder comprises Glucoino-delta lactone, sodium bicarbonate, or a mixture thereof.

The mixture may be prepared and extruded in any pasta extrusion way known to one of ordinary skill in the art. Preferably, the pasta is prepared and extruded by means of an equipment comprising a paddle mixer, a twin screw kneader, and a single screw extruder; a twin screw mixer-kneader and a single screw extruder; a twin screw mixer-kneader-extruder; or a twin screw mixer-kneader assisted by a gear pump. Care may be taken to ensure that the temperature of the mixture during mixing and/or kneading and extrusion remains below about 55° C.

The extruded pasta may be cut into long pasta goods such as long spaghetti. Preferably, the extruded pasta is cut into short pasta goods such as short spaghetti, linguine, cliche, or even local specialities such as "Spätzle" from central Europe. The step of portioning, namely dividing or dosing the pasta into portions which then will be individually packaged, may be carried out at any stage after the cutting step and before the packaging step. The extruded pasta may be hot-air treated to fix the shape before blanching and to obtain a product firmer in bite. The extruded pasta may be blanched by steaming or by the combination of steaming and hot-water spraying. Preferably the extruded pasta is blanched by hot-acid-water spraying, the purpose of water-spraying during steaming being to minimize starch losses during blanching. The blanching step may be carried out at about 95 to 100° C. for about 1 to 10 mim while steaming with steam at about 98 to 100° C. and spraying water at about 95 to 98° C., preferably with water having a pH of about 3.5 to 5. During the blanching step, the water uptake may be such that the pasta has a dry-matter content of about 35 to 52 percent. Preferably, the water uptake may be such that the pasta has then a dry-matter content of about 39 to 47 percent.

After the blanching step, the pasta may be advantageously passed under a shower of hot water. Preferably, the water has a temperature from about 60 to 70° C. in order to loosen any strands of pasta product that can be slightly sticky after having been steamed.

Water cooling may be carried out in a bath of water at ambient temperature, namely at a temperature of between about 18 to 35° C., for a duration of about 30 s to 2 min.

After water cooling, excess water may be drained off for a duration of about 30 s to 2 min. During the water cooling step, the blanching step may be stopped completely and the water uptake may be such that the pasta has then a dry-matter content from about 30 to 45 percent. Preferably, the dry-matter content is from about 33 to 42 percent.

After water cooling and possibly draining off excess water, the pasta is dipped into acidified water in order to obtain a final pH of about 3.5 to 4.5. To this end, the pasta may be dipped into water containing from 0.5 to 2 percent acid. Preferably, the acidified water comprises lactic acid, phosphoric acid, citric acid, Glucono-delta-lactone, or a mixture thereof. The acidified water is preferably at ambient temperature, typically about 18 to 35° C., for a duration of about 50 to 250 s.

After this acidifying step, excess acidified water may be drained off for a duration of about 30 s to 2 min. During the acidifying step, there is very little further water uptake. Not wishing to be bound by any particular theory, the acidification of the pasta appears to be mainly a result of osmotic equilibration.

The oiling step may be carried out so that the surface of the pasta is coated with oil in an amount from about 0.5 to 5 percent by weight of the pasta. In order that the oil is well distributed over the pasta surface, emulsifiers, in an amount of about 0.5 to 2 percent by weight of the oil, may be added to the oil. The oiling step may be carried out either before or during the packaging step. Preferably, the pasta is packaged in a flexible pouch with controlled volume of head space. To this end, the pasta may be dosed into a vertical pouch after its bottom has been sealed and oil may be injected into the pouch before its top is sealed. Eventually, the packaged pasta product is in-pack pasteurized.

The in-pack pasteurizing step may be carried out in a steam medium.

During the steaming, the temperature in the center of the pouch containing the packages pasta preferably reaches a temperature of about 80 to 100° C. for a duration of about 1 to 80 min. The pouches may then be cooled in cold water containing a disinfectant for about 5 to 15 min. or by chilled air for a duration of about 30 to 60 min at a temperature of about 5 to 15° C.

The present process may be implemented by means of normal equipment such as mixer, kneader, extruder, steeping unit, steam/water spraying blancher, water bath, shower, and pasteurizing unit from the pasta or noodle industry. The present process surprisingly provides a pasta product having outstanding organoleptical properties, especially outstanding texture, in view of the fact that it is not intended to be actually cooked again at the consumer's end but only heated up or very shortly cooked. Heating tip or very shortly cooking the present pasta product may be carried out in a variety of ways, Such as heating in a pan, in a microwave oven, or by pouring hot or boiling water onto the pasta product.

The pasta product and the process according to the present invention are illustrated in the following Examples in which the percentages and parts are by weight of total pasta, unless otherwise stated.

EXAMPLES

Example 1

A pre-cooked spaghetti product, having a long shelf life, was made from a mixture having a dry-matter content of 68.2 percent and comprising 76 percent Durum semolina, 2.35 percent "FLAVOR PRO" 6000, and 21.65 percent tap water.

Durum semolina and "FLAVOR PRO" 6000 were pre-mixed with water. The mixture was kneaded to a dough and extruded using a regular pasta-extruder manufactured by Mapimpianti. The pressure in front of the die was between 100 and 110 bar with a dough temperature of 40 to 42° C. The die had circular openings having a diameter of 2.2 mm. The freshly extruded pasta was cut to a length of 25 to 26 cm and portioned or dosed in 104-g portions.

The pasta was then blanched at 98° C. for a duration of 200 s along a tunnel blancher in which steam injection means injected steam at 99° C. and water spraying means sprayed acidified water having a pH of 4.3 and a temperature of about 96–97° C. During the blanching step, the water uptake was such that the pasta had a dry-matter content of 41 to 45 percent.

After the blanching step, the pasta was showered with a hot water spray having a temperature of 60 to 70° C., and it was then water-cooled for 45 s in a bath of water at a temperature of 20 to 25° C.

During the water cooling step, the water uptake was such that the pasta had a dry-matter content of from 38 to 42 percent. After water cooling, excess water was drained off for 60 s. The pasta was then dipped for 150 s into a water bath containing 1.6 percent lactic acid, having a pH of 2.2 to 2.3 and having a temperature of 30° C.

During the acidifying step, the water uptake was such that the pasta had a dry-matter content of 36 to 40 percent. After the acidifying step, excess acidified water was drained off for 60 s. After the acidifying step the pasta had a pH of 3.9 to 4.0.

The pasta portions, then weighing 180 g, were dosed into vertical pouches after their bottoms had been sealed, and 1.8 g palmolein were injected into each pouch before their tops were sealed.

The pasta was in-pack pasteurized in steam at 97° C., the temperature in the center of the pouch reaching a temperature of 85° C. after 20 min and this temperature being held for 10 min. The pouches were then cooled for 10 min in water having a temperature of 10° C. and containing a disinfectant. The pouches were subsequently stored at room temperature, namely at 25° C.

The pasta product could be prepared for consumption by unpacking and heating up. Additionally, the pasta did not stick together and it had outstanding organoleptical properties, especially a texture similar to the texture of fresh cooked spaghetti.

Example 2

A pre-cooked "Spätzle" product having a long shelf life was made from a mixture having a dry-matter content of 71.5 percent and having the following composition in weight percent:

| Ingredients | Weight Percent |
| --- | --- |
| Durum semolina | 65 |
| Soft wheat flour | 7.3 |
| Liquid whole egg | 10.8 |
| Glucono-delta-lactone | 3.251 |
| NaHCO$_3$ | 1.084 |
| Spices | 0.525 |
| Tap water | 12.04 |

The dry ingredients were premixed with liquid whole egg and water. The mixture was kneaded to a dough and extruded using a regular pasta-extruder manufactured by the company Toresani. The pressure in front of the die was 30 bar with a dough temperature of 43° C. The die had oblong openings that were 2 mm in width, and a few mm in length. The fresh extruded pasta was cut to 4 to 5 cm in length and portioned or dosed in 100-g portions.

The portioned pasta was then blanched, showered, water cooled, dipped into an acid-containing water bath, oiled, packaged and in-pack pasteurized as disclosed in Example 1, except that the "Spätzle" pasta was blanched for 450 s instead of 200 s and that it was dipped in the acid containing water bath for 180 s instead of 150 s.

The in pack pasteurized full moisture shelf stable "Spätzle" product thus obtained had a pH of 4.0 to 4.1 and had a dry-matter content of 9 to 40 percent.

The pasta product could be prepared for consumption by heating up. The pasta did not stick together. It had outstanding organoleptical properties, especially a texture similar to the texture of fresh cooked "Spätzle".

What is claimed:

1. A process for manufacturing a full-moisture, shelf-stable pasta product, which comprises:

preparing a mixture comprising a cereal flour, semolina, or a mixture thereof and water wherein the mixture has a dry-matter content of 60 to 75 weight percent;

forming a portioned pasta product;

blanching the pasta product at a temperature of about 95 to 100° C. for a duration of about 1 to 10 minutes, while steaming with steam having a temperature of about 98 to 100° C. and spraying with water having a temperature of about 95 to 98° C. and a pH of about 3.5 to 5;

dipping the blanched pasta product into acidified water at ambient temperature; and packaging the pasta product.

2. The method of claim 1, wherein the semolina is durum or hard wheat semolina.

3. The method of claim 1, wherein the mixture further comprises one or more additives from the group consisting of wheat protein, soft wheat flour, egg material, baking powder, sodium chloride, spices, and mixtures thereof.

4. The method of claim 1, wherein the blanched pasta product has a dry matter content of about 35 to 52 percent.

5. The process of claim 1, further comprising spraying the pasta product with water having a temperature of about 60 to 70° C. after blanching to loosen strands of pasta that may be stuck together.

6. The process of claim 1, further comprising the step of cooling the blanched pasta product by dipping the blanched pasta product into water at a temperature of from about 18° to 35° C. for about 30 seconds to 2 minutes.

7. The process of claim 1, further comprising the step of oiling the pasta product after the pasta product is dipped into acidic water to provide a pasta product coated with oil.

8. The process of claim 7, wherein the oil is present in an amount of about 0.5 to 5 percent by weight of the coated pasta product.

9. The process of claim 8, wherein the oil further comprises an emulsifier in an amount of about 0.5 to 2 percent by weight of the oil.

10. The process of claim 9, wherein the emulsifier is one or more monoglycerides.

11. The process of claim 7, wherein the oil is a vegetable oil.

12. The process of claim 11, wherein the vegetable oil is peanut oil, rapeseed oil, sunflower oil, palm oil, corn oil, palm olein, or a mixture thereof.

13. The process of claim 1, wherein the dipping has a duration of from about 50 to 250 seconds and the acidified water comprises about 0.5 to 2 percent acid.

14. The process of claim 1, wherein the acidified water comprises lactic acid, phosphoric acid, citric acid, Glucono-delta-lactone, or a mixture thereof.

* * * * *